United States Patent [19]

Marshall et al.

[11] Patent Number: 4,841,404
[45] Date of Patent: Jun. 20, 1989

[54] PUMP AND ELECTRIC MOTOR PROTECTOR

[75] Inventors: William W. Marshall, Centerville; Lamar D. Springer, Spring Valley, both of Ohio

[73] Assignee: Spring Valley Associates, Inc., Dayton, Ohio

[21] Appl. No.: 106,048

[22] Filed: Oct. 7, 1987

[51] Int. Cl.$^4$ .............................................. H02H 5/00
[52] U.S. Cl. ....................................... 361/30; 361/31; 361/33; 361/85; 361/93; 361/88; 318/455; 417/18; 417/14
[58] Field of Search ................. 361/33, 23, 20, 31, 361/79, 85, 86, 87, 88, 92; 318/455; 417/18, 45

[56] References Cited

U.S. PATENT DOCUMENTS

| | | | |
|---|---|---|---|
| 2,856,574 | 10/1958 | Schaefer | 318/455 |
| 2,947,931 | 8/1960 | Hubby | 318/447 |
| 2,953,722 | 9/1960 | Willis | 361/85 |
| 2,992,365 | 7/1961 | Brill | 361/112 |
| 2,995,684 | 8/1961 | Fleming | 361/79 |
| 3,408,940 | 11/1968 | McGrogan | 417/112 |
| 3,417,290 | 12/1968 | Craddock | 361/31 |
| 3,519,910 | 7/1970 | Pfaff et al. | 318/805 |
| 3,600,657 | 8/1971 | Pfaff | 323/224 |
| 3,727,103 | 4/1973 | Finch et al. | 361/30 |
| 3,855,515 | 12/1974 | Hutchins, Jr. | 318/685 |
| 3,931,559 | 1/1976 | McKee | 318/455 |
| 3,953,777 | 4/1976 | McKee | 318/45 X |
| 3,985,467 | 10/1976 | Lefferson | 417/45 X |
| 4,034,269 | 7/1977 | Wilkinson | 361/79 |
| 4,091,433 | 5/1978 | Wilkinson | 361/79 X |
| 4,105,367 | 8/1978 | Francis, Jr. | 417/36 |
| 4,117,408 | 9/1978 | Comstedt | 328/133 |
| 4,257,746 | 3/1981 | Wells | 417/45 |
| 4,286,925 | 9/1981 | Standish | 417/12 |
| 4,287,431 | 9/1981 | Yasui et al. | 307/10 R |
| 4,290,007 | 9/1981 | Fisher et al. | 323/270 |
| 4,290,057 | 9/1981 | Knight | 340/539 |
| 4,420,787 | 12/1983 | Tibbits et al. | 361/79 |
| 4,642,478 | 2/1987 | Noth | 207/118 |
| 4,703,387 | 10/1987 | Miller | 361/30 X |

FOREIGN PATENT DOCUMENTS 650153 2/1979 U.S.S.R. .

*Primary Examiner*—Derek S. Jennings
*Attorney, Agent, or Firm*—Jacox & Meckstroth

[57] ABSTRACT

An electrical circuit for providing electrical energy to an electric motor which operates a liquid pump. The motor and the pump are adapted to be submerged in the liquid which is pumped by the pump. The circuit disclosed herein senses the phase angle between the current and the voltage applied to the electric motor. When the phase angle indicates that the motor is operating without a load, the circuit deenergizes the electric motor. Thus, the motor and the liquid pump are protected against damage. Recognizing that harmonics may exist in the current flow through the motor, the circuit provides for obtaining a filtered signal proportional to the fundamental frequency of the current flowing through the motor. Thus, an accurate measurement of the loading of a motor is obtained. The circuitry of this invention also provides an accurate method of compensation for applied line voltage variations, so that a change in the applied line voltage does not produce a false indication that the motor loading has changed.

10 Claims, 2 Drawing Sheets

NORMAL OPERATION

RUNNING DRY OPERATION

NORMAL OPERATION
FILTERED WAVEFORM

RUNNING DRY OPERATION
FILTERED WAVEFORM

PUMP AND ELECTRIC MOTOR PROTECTOR

BACKGROUND OF THE INVENTION

A water pump and the electric motor which operates the pump are submerged in a well of water in a typical installation. In many installations, there is the possibility that the level of the water in the well may drop below the pump in which event the pump and/or the motor will be damaged as a result of improper operation.

Many types of water pump and motor protector devices have been devised to prevent pump and/or pump motor damage. Most of these devices require an element to sense the water level condition, and to provide a current or voltage to indicate a low water condition. Another class of device is strictly mechanical in nature, and uses a float to divert water back into the well. This reduced flow from the well prevents the pump from running dry. All of these devices which utilize some sensing mechanism in the water are prone to reliability problems, primarily as a result of the buildup of minerals from the water on the apparatus.

Another class of devices for pump and pump motor protection senses the changes in the electrical operation of the pump motor when it is pumping water and when it is not pumping water, as the means of detecting a low water condition. Several pump motor operating electrical characteristics can be sensed and used for this purpose. Typically, energy consumed by the pump motor is less when the pump in not pumping water. This change is detected by electronic means, and a switch or relay is actuated to deenergize the circuit to the pump motor when a low water condition is sensed.

U.S. Pat. No. 4,420,787 discloses circuitry which senses changes in power factor to deenergize an electric motor which operates a water pump. Power factor is defined as the cosine of the angle between applied voltage and the current flowing to the motor. When the power factor is used as a method of determining the loading of the pump motor, the phase angle between the voltage and current is measured.

When the phase angle between voltage and current is sensed and used, the customary method is to determine the zero crossings of the voltage and the zero crossings of the current and measure the time between the voltage and current crossings to provide a measure of the phase angle. The phase angle may range between zero (when the voltage and current are in phase), and up to 180° out of phase. The actual phase measurement is accomplished by either measuring the time between zero crossings by counting the number of pulses of a clock between zero crossings, or by developing a series of pulses, the width of which is equal to the distance between the zero crossings, followed by developing a direct current voltage proportional to pulse width, simply by integrating the pulses.

This approach is satisfactory with most alternating current electric motors, particularly those that have a starting winding which is switched out of the circuit after the motor has started (capacitor start, induction run motors.) However, when other motors, such as permanent split capacitor induction motors are used, significant harmonic frequencies may exist in the current waveform. The harmonic frequencies interfere with obtaining an accurate measurement of the zero crossings of the fundamental frequency. Thus, these harmonic frequencies produce errors in the accurate measurement of the phase angle between the voltage and current supplied to the pump motor.

In many pump and motor installations, another problem exists in attempts to accurately deenergize the pump motor when a low water level condition exists. The applied voltage to the pump motor may vary. A variation in applied voltage produces changes in the phase angle, and may result in deenergization of the pump motor even though the pump is delivering water. It is desirable that a change in amplitude of the applied voltage should not produce an indication that a low water level condition exists. Experimental data indicate that the variation is phase angle versus the applied voltage approaches a straight line. Thus, a method of compensating for such voltage variations is necessary to prevent false tripping, or false indications of a low water condition.

It is an object of this invention to provide a pump and electric motor protector mechanism which employs changes in phase angle to deenergize the pump motor when a low water level condition exists.

Another object of this invention is to provide such protector mechanism which includes electrical circuitry which provides a waveform which is related to the current flowing in the electric motor and in which harmonics in this waveform are attenuated. The signal is employed in phase angle measurement. Thus, there are no zero crossing errors which produce errors in the measurement of the phase angle between voltage and current.

It is another object of this invention to provide electrical circuitry which compensates for variations in applied line voltage, so that these variations do not produce false indications of a low water condition.

Other objects and advantages of this invention reside in the combination of elements of the circuitry, the mode of operation, and the methods involved as will become more apparent from the following description.

SUMMARY OF THE INVENTION

Some types of electric motors generate harmonic frequencies in the current flowing through the electric motor. When changes in phase angle are employed for motor or pump protection, the harmonic frequencies present problems in accurate measurement of the phase angle between the voltage and the current applied to the electric motor. The problems are created due to the fact that accurate determination of the zero crossings of the current waveforms at the fundamental frequency is impossible or difficult when harmonic frequencies are involved. Thus, false readings are created in the phase detector circuit and unnecessary deenergization of the electric motor occurs.

This invention includes means creating a signal which is related to the current flow through the electric motor and which includes means for attenuation of the harmonic frequencies in the signal. Thus, alternating current waveforms which contain primarily the fundamental frequency are obtained and are transmitted to the phase detector circuits. Therefore, the phase measurement can be substantially accurate, and deenergization of the electric motor occurs only if the low water level occurs.

Another problem involved in a protective circuit for electric pump motor and pump is related to the fact that the voltage applied to the electric motor may vary in amplitude. This variation in voltage amplitude produces a change in the phase anle, and may cause deenergization of the pump motor even though the pump is delivering water.

Therefore, this invention includes means for compensating for phase angle variations which occur with variations in the voltage applied to the electric motor.

DETAILED DESCRIPTION OF THE INVENTION

Figure 1:
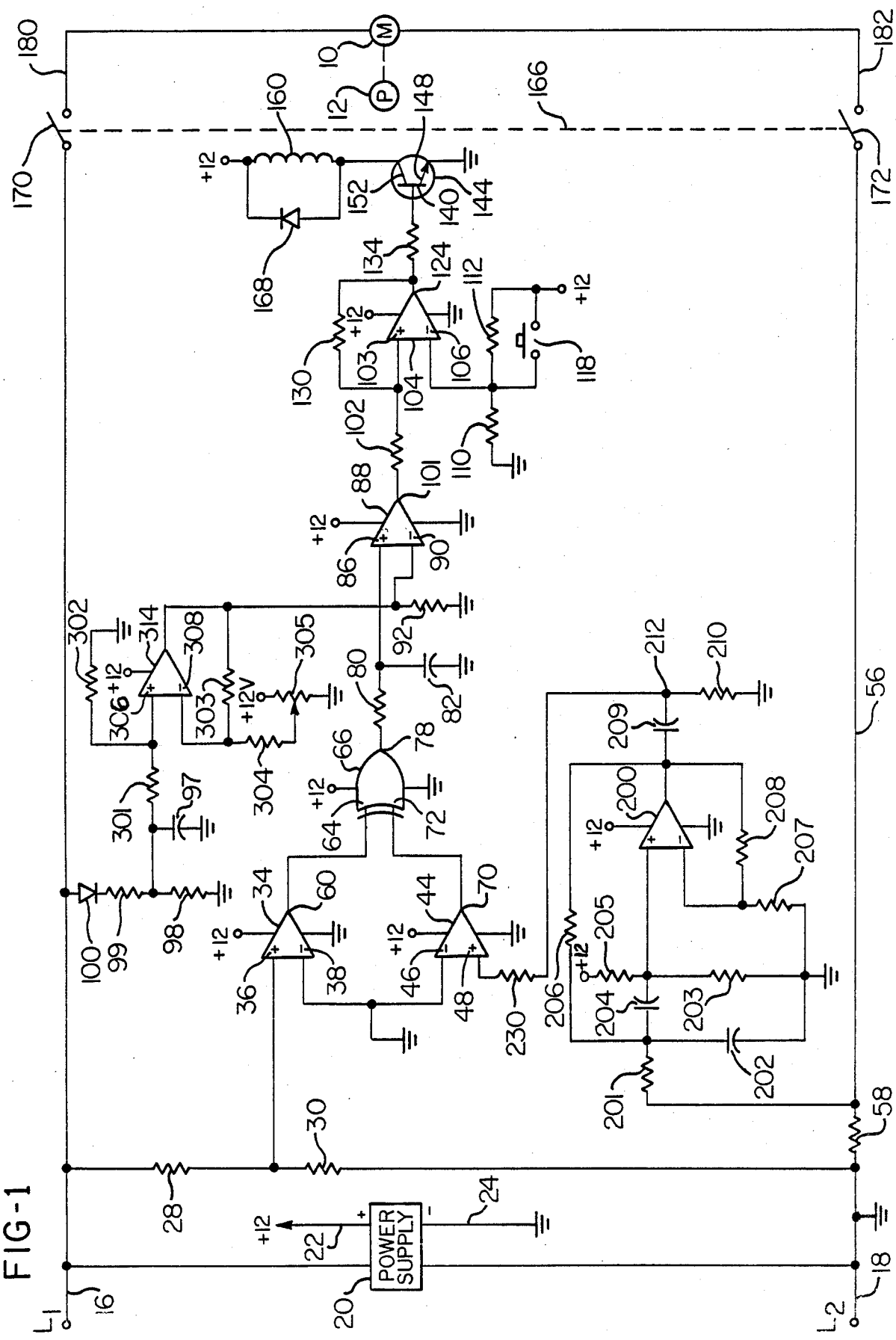
FIG. 1 is a schematic diagram of the electrical circuitry of this invention.

The circuitry of this invention as shown in FIG. 1 provides electrical energy to an electric motor 10 which operates a water pump 12. The pump 12 and the motor 10 are conventionally submerged within a body of water from which water is pumped by the pump 12 and by operation of the motor 10.

The electrical energy for operation of the electric motor 10 is provided through incoming lines 16 and 18. The incoming line 18 is shown as being grounded only for denoting a reference point for the electrical circuitry of this invention.

Joined to the incoming lines 16 and 18 is a power supply unit 20 which provides electrical energy to the numerous devices of the circuitry. The power supply unit 20 is shown as having an output line 22 of positive potential, herein illustrated as 12 volts D.C., and an output line 24 of ground potential.

Connected between the incoming lines 16 and 18 is a resistor 28 and a resistor 30, which are connected in series to constitute a voltage divider circuit. An operational amplifier 34 has an input terminal 36 joined to the resistors 28 and 30. Another terminal 38 of the operational amplifier 34 is shown connected to ground potential.

A resistor 58 is connected to the resistor 30 and to a conductor 56, which is connected to a resistor 201. Resistors 201, 203, 205, 206, 207, and 208, capacitors 202 and 204, and an operational amplifier 200 are interconnected to a capacitor 209. The output of the capacitor 209 is connected to a resistor 230. A resistor 210 connects the capacitor 209 to ground. An output terminal 212 joins the capacitor 209 to the resistor 230 and to the resistor 210. The capacitor 202 and the resistors 203 and 207 are also connected to ground.

An operational amplifier 44 has a terminal 46 joined to ground potential and a terminal 48 joined to the resistor 230.

The operational amplifier 34 has an output terminal 60 connected to a terminal 64 of an exclusive-OR-gate device 66. The operational amplifier 44 has an output terminal 70 joined to a terminal 72 of the exclusive-OR-gate device 66. The exclusive-OR-gate device 66 has an output terminal 78 joined to a resistor 80 which is connected to ground potential through a capacitor 82. The resistor 80 is also connected to an input terminal 86 of an operational amplifier 88. The operational amplifier 88 also has an input terminal 90 connected to a resistor 92, which is also connected to ground.

A diode 100 is connected to the line 16. Joined to the diode 100 is a resistor 99. A resistor 98 is connected to the resistor 99. Connected to the resistors 98 and 99 is a capacitor 97 and a resistor 301. A resistor 302 connects the resistor 301 to ground. The resistors 301 and 302 are connected to an input terminal 306 of an operational amplifier 314. The operational amplifier 314 also has an input terminal 308, which is connected to a resistor 303. The output of the operational amplifier 314 is connected to the resistor 92 and to the terminal 90 of the operational amplifier 88. The output of the operational amplifier 314 is also connected to the resistor 303, which is connected to a resistor 304. The resistor 304 is connected to a potentiometer 305 which is connected to the power supply and to ground.

The operational amplifier 88 has an output terminal 101 which is connected to a resistor 102. The resistor 102 is also joined to an input terminal 103 of an operational amplifier 104. The operational amplifier 104 also has an input terminal 106 which is connected to ground potential through a resistor 110. A resistor 112 is also connected to the input terminal 106 and to the output of the power supply unit 20. Connected across the resistor 112 is a momentary reset switch 118. The operational amplifier 104 has an output terminal 124 which is connected to the input terminal 103 through a resistor 130. The output terminal 124 of the operational amplifier 104 is also joined to a resistor 134 which is also connected to a base 140 of a transistor 144. The transistor 144 also has an emitter 148 which is shown connected to ground potential. The transistor 144 also has a collector 152 which is joined to an actuator coil 160 of a power switch 166. A diode 168 is shown connected across the actuator coil 160. The power switch 166 has switch members 170 and 172 which are joined to output lines 180 and 182, to which the electric motor 10 is connected.

Operation

A suitable voltage is applied to the incoming lines 16 and 18 for operation of the electric motor 10 and for energization of the elements of the control circuitry. The voltage applied to the incoming lines 16 and 18 is applied to the motor 10 through the switches 170 and 172. The power supply output lines 22 and 24 are effectively joined, in a manner not illustrated, to devices of the circuitry such as devices 34, 44, 66, 88, 104, 200, and 314 for energization thereof.

The input terminals 36 and 38 of the operational amplifier 34 are connected to sense the voltage between the incoming lines 16 and 18 and to provide a signal proportional to that voltage. The output of the operational amplifier 34 at the output terminal 60 is positive, herein shown as 12 volts, during each positive half cycle of the voltage applied to the input lines 16 and 18. During each negative half cycle of this voltage the output voltage of the operational amplifier 34 is zero. This output of the operational amplifier 34 is applied to the input terminal 64 of the exclusive-OR-gate 66.

The signal applied to resistor 201 is a voltage generated by current flow through the resistor 58. Resistors 201, 203, 205, 206, 207, and 208, capacitors 202 and 204, and the operational amplifier 200 form an active band pass filter, which has a center frequency at the fundamental frequency of the alternating current voltage applied to the terminals 16 and 18. Other frequencies contained in the voltage at the resistor 201 are attenuated relative this fundamental frequency, with the attenuation being a function of the difference between the other frequencies and the fundamental frequency.

The capacitor 209 and resistor 210 form a first-order high pass filter, which acts as an alternating current coupling network to provide a signal at the terminal 212 with no direct current offset for the input to resistor 230.

Figure 4:
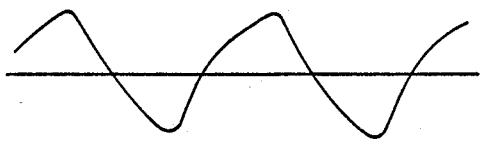
FIG. 4 illustrates a typical signal representing the current flow through the electric motor which operates the pump when the pump is pumping liquid.

The waveform of FIG. 4 represents a voltage which is proportional to the current flow through resistor 58. The current through the resistor 58 is also the current flowing through the motor 10.

Figure 5:
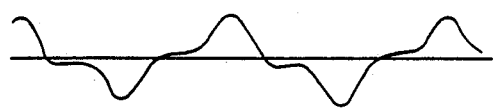
FIG. 5 illustrates the signal representing the current flow through the electric motor when the pump operated by the motor is not pumping liquid.

FIG. 5 represents a voltage which is proportional to the current flow through the resistor 58 when the pump 12 is not pumping liquid.

Figure 6:
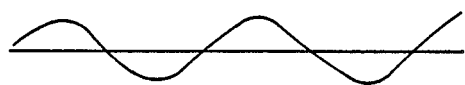
FIG. 6 is a typical waveform representing the pump motor operating current during normal pumping conditions and when the signal is filtered in accordance with this invention.

FIG. 6 illustrates a typical voltage waveform at the terminal 212, which is a circuit position after the current waveform is filtered, and when the pump 12 is pumping liquid.

Figure 7:
FIG 7 is a typical waveform representing the pump motor operating current when the pump is not pumping liquid and when the signal is filtered in accordance with this invention.

FIG. 7 illustrates a typical voltage waveform at the output terminal 212 when the pump is not pumping fluid.

As a result of the filtering action discussed above, the voltage applied to the terminals 46 and 48 is in phase with the current flow at the fundamental frequency through the resistor 58 and is in phase with the current flow at the fundamental frequency which flows to the motor 10 through the line 56. The signal at the output terminal 70 of the operational amplifier 44 is positive, herein shown as 12 volts, during each positive half cycle of the current flow at the fundamental frequency through the resistor 58. During each negative half cycle of the current flow through the resistor 58 at the fundamental frequency the output voltage of the operational amplifier 44 at the output terminal 70 is zero. This output voltage of the operational amplifier 44 is applied to the terminal 72 of the exclusive-OR-gate 66. The exclusive-OR-gate 66 herein serves as a phase detector.

Figure 2:
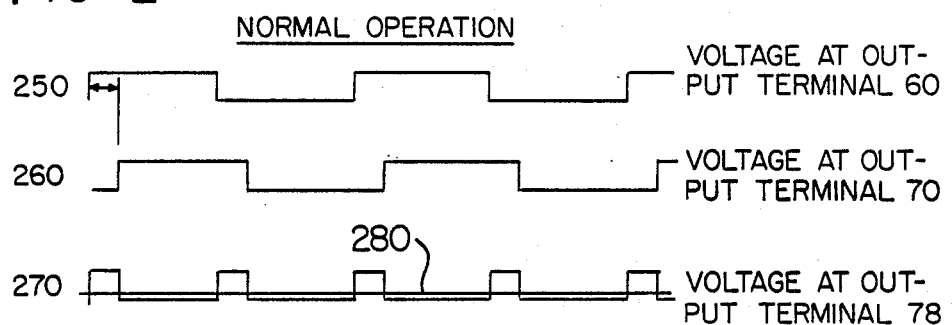
FIG. 2 is a set of electric waveforms which illustrate operation of the electric circuit while a liquid pump operated thereby is pumping liquid.

FIG. 2 shows waveforms 250, 260, and 270, which illustrate conditions within the control circuitry during the time that the motor 10 is pumping water. Waveform 250 represents the voltage at the output terminal 60 of the operational amplifier 34, which voltage is in phase with the voltage across the incoming lines 16 and 18. Waveform 260 of FIG. 2 represents the voltage at the output terminal 70 of the operational amplifier 44, which voltage is in phase with the current flowing at the fundamental frequency in the incoming line 18. Waveform 270 of FIG. 2 illustrates the voltage at the output terminal 78 of the exclusive-OR-gate 66 and also illustrates the magnitude of the phase angle between the voltage applied across incoming lines 16 and 18 and the current flow at the fundamental frequency in the conductor 56. Due to the fact that the motor 10 under normal load conditions has less than unity power factor, there is a phase angle between the voltage and current applied to the motor 10, as illustrated in FIG. 2.

It is to be noted that the waveform 270 in FIG. 2, which illustrates the voltage at the output terminal 78 of the exclusive-OR-gate 66, is positive only during the period of time that only one of the waveforms 250 and 260 is zero. The voltage represented by the wave form 270 has an average voltage level 280, as illustrated in FIG. 2. The average voltage level 280 is relatively low because the voltage represented by the waveform 270 is zero during most of the time.

Figure 3:
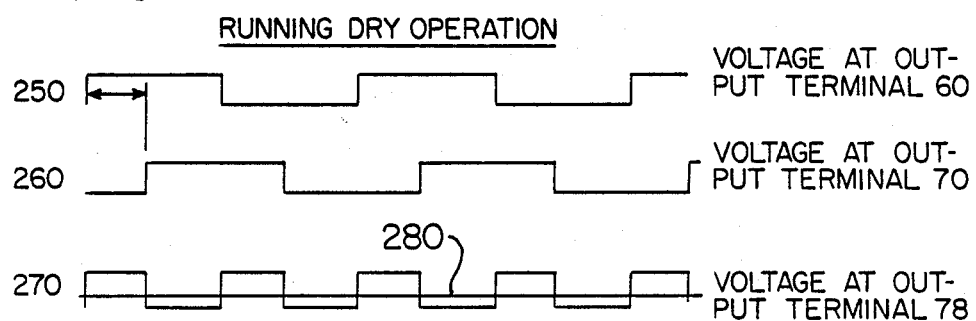
FIG. 3 is a set of electric waveforms which illustrate operation of the electric circuit when the liquid pump is not pumping liquid.

If the supply of water to the pump 12 ceases, the pump 12, operated by the motor 10, does not pump water. Under such conditions, the circuitry of this invention functions as illustrated in FIG. 3. It is noted that the phase angle between the voltage and the current at the fundamental frequency applied to the motor 10 increases significantly over that illustrated in FIG. 2. Therefore, the period of time during which there is a voltage at the output terminal 78 of the exclusive-OR-gate 66 is significantly increased, as illustrated by the waveform 270 in FIG. 3. In both FIGS. 2 and 3 the average voltage level 280 is directly proportional to the phase angle between the wave forms 250 and 260.

As illustrated in FIG. 3, the average output voltage 280 at the terminal 78 of the exclusive-OR-gate 66 is significantly greater during the time that the pump 12, operated by the electric motor 10, is not pumping water and as the motor 10 continues to operate. This average output voltage 280 at the terminal 78 is applied to the resistor 80 and to the capacitor 82, which serve to filter the alternating current component from this output voltage. These elements function to provide the average direct current voltage 280, illustrated in FIG. 3, to the input terminal 86 of the operational amplifier 88.

The operational amplifier 88 compares the voltage applied to the terminal 86 with a voltage applied to the terminal 90 thereof.

The voltage applied to the terminal 90 is a direct current voltage which is proportional to a fixed fraction of the direct current voltage which is proportional to the alternating current line voltage across lines 16 and 18, minus a constant direct current voltage.

The alternating current voltage at the line 16 is rectified by the diode 100 and is directed to the voltage divider formed by the resistors 99 and 98. The voltage at the junction of the resistors 98 and 99 is filtered by the capacitor 97 and is supplied to the input of the resistor 301, which is an input to the operational amplifier 314. The input to the terminal 308 of the operation amplifier 314 is a direct current voltage, the amplitude of which is set by the potentiometer 305. The operational amplifier 314 functions as a differential amplifier, with a positive direct current output voltage which is proportional to the alternating current line voltage, minus a voltage which is set by the potentiometer 305. Thus, the output of the operational amplifier 314 is a voltage of the form:

$V = mV_L - K$, where m is a constant slope, and

K is a value set by the potentiometer 305.

Thus, there is compensation for phase angle variations which occur with variations in the voltage applied to the incoming lines 16 and 18.

During the time that the average voltage level 280 of the exclusive-OR-gate 66 is relatively low, as illustrated in FIG. 2, the voltage applied to the terminal 86 of the operational amplifier 88 is less than the voltage applied to the terminal 90 of the operational amplifier 88. Under these conditions, there is no output from the operational amplifier 88 at the output terminal 101.

However, when the pump 12 which is operated by the motor 10 ceases to pump water, the conditions become those illustrated in FIG. 3. The average voltage level 280 illustrated in FIG. 3 becomes so great that the voltage applied to the terminal 86 of the operational amplifier 88 exceeds the voltage applied to the terminal 90 of the operational amplifier 88. Therefore, the operational amplifier 88 produces a voltage at the output terminal 101 thereof. This voltage is transmitted to the input terminal 103 of the operational amplifier 104. This voltage which is applied to the terminal 103 of the operational amplifier 104 is greater than the constant voltage applied to the terminal 106 thereof. Therefore, a positive signal is created at the output terminal 124 of the operational amplifier 104. A positive feedback voltage is applied to the input terminal 103 from the output terminal 124 of the operational amplifier 104, through the resistor 130. Thus, there is constant output voltage at the terminal 124 of the operational amplifier 104, beginning the instant that a voltage output is initiated at the terminal 124. Thus, a "latch-in" condition exists.

The output voltage at the terminal 124 of the operational amplifier 104 creates a current flow through the resistor 134 to the base 140 of the transistor 144. When this occurs, the transistor 144 transmits current through the actuator coil 160. This current flow operates the power switch 166 to open the switch members 170 and 172. When this occurs, the electric motor 10 is deenergized, and the pump 12 ceases to operate.

Thus, the motor 10 and the pump 12 are protected against damage which occurs under low water conditions.

The reset switch 118 is employed to momentarily connect the terminal 106 of the operational amplifier 104 to the full power supply voltage to increase the voltage applied to the terminal 106, to deenergize the operational amplifier 104 and to close the switch members 170 and 172 when the pump 12 again has water to pump. The reset switch 118 may be operated manually or automatically.

Although the preferred embodiment of the pump and electric motor protector unit of this invention has been described, it will be understood that within the purview of this invention various changes may be made in the form, details, proportion and arrangement of elements, the combination thereof, and the mode and method of operation, analog or digital, which generally stated consist in a pump and electric motor protector unit and method of this invention within the scope of the appended claims.

The invention having thus been described, the following is claimed:

1. An electric circuit for energization of an electric motor and for protection of a fluid pump operated by an electric motor which is joined to a source of alternating current electrical energy and in which the alternating current which flows through the electric motor may include harmonic frequencies and in which the source of the alternating current voltage has a fundamental frequency which may vary in amplitude, comprising:

a plurality of electric conductors for attachment to a source of alternating current electrical energy, switch means for connecting the electric conductors to the electric motor, phase angle sensing means for sensing the phase angle between the voltage applied to the electric conductors and the current flowing in the electric conductors, the phase angle sensing means including first signal means, the first signal means providing a signal waveform which represents the voltage applied to the electrical conductors, the phase angle sensing means also including second signal means, the second signal means providing a signal waveform representing the current flow through the electric conductors, the phase angle sensing means also including means for attenuating harmonic frequencies in the signal provided by the second sensing means to provide accurate measurement of the voltage and current waveforms in the signals, means joining the phase angle sensing means to the electric conductors, actuator means for operation of the switch means to disconnect the electric conductors from the electric motor, voltage level sensing means, voltage compensation means connected to one of the electric conductors and to the voltage level sensing means, the voltage compensation means including means compensating for variations in the phase angle between the applied voltage to the electric conductors and the alternating current flow through the electric conductors with variations in amplitude of the applied voltage, the voltage compensation means thus providing a voltage signal to the voltage level sensing means which compensates for variations in the amplitude of the alternating current voltage, and means joining the voltage level sensing means to the actuator means and to the phase detector means, whereby the phase detector means and the voltage compensation means provide voltage signals to the voltage level sensing means in accordance with the phase angle for energization of the actuator means by the voltage level sensing means, whereby the voltage level sensing means energizes the actuator means in response to a predetermined shift in said phase angle in response to a combination of the voltage signals applied to the voltage sensing means by the phase detector means and by the voltage compensation means.

2. The method of protecting a liquid pump which is operated by an electric motor to which alternating current electrical energy having a fundamental frequency is applied through a plurality of electric conductor members, and a switch operable to connect and to disconnect the electric motor with respect to the electric conductor members comprising:

providing a first voltage signal, the first voltage signal being related to the current flow through the electric conductor members and through the electric motor, attenuating harmonic frequencies which may exist in the first voltage signal as a result of current flow through the electric motor and providing a modified first voltage signal, providing a second voltage signal, the second voltage signal being related to the voltage of the alternating current electrical energy which is applied to the electric conductor members, sensing the phase angle between the modified first voltage signal and the second voltage signal and obtaining a phase angle voltage signal proportional to the phase angle, generating a third voltage signal in accordance with the amplitude of the voltage of the alternating current electrical energy which is applied to the electric conductor members, modifying the third voltage signal to obtain a fourth voltage signal which compensates for changes in phase angle which occur as a result of variations in the amplitude of the voltage of the alternating current electrical energy which is applied to the electric conductor members, comparing the phase angle voltage signal to the fourth voltage signal, and operating the switch when the difference between the phase angle voltage signal and the fourth voltage signal exceeds a predetermined magnitude.

3. The method of claim 2 in which the modifying of the third voltage signal to obtain the fourth voltage signal includes modifying the voltage signal in accordance with m(VLine)−k, in which VLine is the potential applied to the electric conductor members, and in which m is a constant slope and in which k is a fixed voltage.

4. A protective circuit for a liquid pump which is operated by an electric motor, which is energized by electric circuit means to which alternating current electrical energy is applied, including switch means for connection of the electric motor to the electric circuit means for energization of the electric motor, the alternating current electrical energy being of the type having a given fundamental frequency which may vary in amplitude, the protective circuit also being of the type which includes phase angle detector means which senses the phase angle between the voltage of the alternating current electrical energy applied to the electric circuit means and the alternating current flow in the electric circuit means, the phase detector means providing an output voltage related to the phase angle between the voltage of the alternating current electrical energy and the alternating current flowing in the electric circuit means, voltage level detector means, means joining the voltage level detector means to the phase detector means for providing a signal from the phase angle detector means to the voltage level detector means in accordance with the phase angle sensed by the phase angle detector means, the voltage level detector means having an output terminal, wherein the voltage level detector means provides a signal at the output terminal thereof during the time that phase angle exceeds a predetermined magnitude, and connection means joining the output terminal of the voltage level detector means to the switch means for operation of the switch means for deenergization of the electric motor, the improvement comprising:

attenuation means for attenuating harmonic frequencies in the alternating current electrical energy flowing through the electric motor, the attenuation means including filter means and amplifier means, means joining the attentuation means to the phase angle detector means, voltage compensation means connected to the electric circuit means, the voltage compensation means including means compensating for variations in phase angle between the voltage of the alternating current electrical energy and the current flow through the electric circuit means as the phase angle changes as a function of the amplitude of the applied voltage, and connection means connecting the voltage compensation means to the voltage level detector means for introducing a signal to the voltage level detector means which compensates for variations in the amplitude of the voltage of the source of the alternating current electrical energy.

5. The method of protecting a liquid pump which is operated by an electric motor to which alternating current electrical energy having a fundamental frequency is applied through a plurality of electric conductor members, and a switch operable to connect and to disconnect the electric motor with respect to the electric conductor members comprising:

providing a first voltage signal, the first voltage signal being related to the current flow through the electric conductor members and through the electric motor, attenuating harmonic frequencies which exist in the first voltage signal, providing a second voltage signal, the second voltage signal being related to the voltage of the alternating current electrical energy which is applied to the electric conductor members, sensing the phase angle between the first voltage signal and the second voltage signal and obtaining a phase angle voltage signal proportional to the phase angle, generating a third voltage signal in accordance with the amplitude of the voltage of the alternating current electrical energy which is applied to the electric conductor members, modifying the third voltage signal to obtain a fourth voltage signal which compensates for changes in phase angle which occur as a result of variations in the amplitude of the voltage of the alternating current electrical energy which is applied to the electric conductor members, comparing the phase angle voltage signal to the fourth voltage signal, and operating the switch when the difference between the phase angle voltage signal and the fourth voltage signal exceeds a predetermined magnitude.

6. A protective circuit for an alternating current electric motor to which electric energy is applied through a plurality of electric conductor members, and in which the amplitude of the applied voltage may vary comprising:

first signal means, the first signal means presenting a signal representing the voltage applied to the conductor members, second signal means, the second signal means presenting a signal representing the current flow through the conductor members, attenuation means attenuating the harmonic frequencies which exist in the second signal means, phase detector means measuring the phase angle between the signal of the first signal means and the signal of the second signal means and providing a voltage signal in accordance with the signals of the first signal means and the second signal means, voltage comparator means, means connecting the voltage comparator means to the phase detector means, whereby the phase detector means provides a voltage signal to the voltage comparator means, voltage compensation means connected to one of the electric conductor members and compensating for variations in the amplitude of the voltage applied to the conductor members, and means connecting the voltage comparator means to the voltage compensation means for providing a compensated voltage signal to the voltage comparator means, the voltage compensation means including third signal means providing a voltage signal proportional to the voltage of said one of the conductor members and amplifier means which includes means for amplifying the voltage signal of the third signal means in accordance with m VL−k, in which m is a fixed value and in which k is an adjustable value and in which VL is the average RMS value of the applied voltage, connector means connecting the switch means to the voltage comparator means and to the conductor members for operation of the switch means by the voltage comparator means for deenergization of the electric motor in accordance with voltage signals applied to the voltage comparator means by the phase detector means and by the voltage compensation means.

7. A protective circuit for a fluid pump which is operated by an alternating current electric motor to which electric energy is applied through a plurality of electric conductor members, and in which the amplitude of the applied voltage may vary, the protective circuit being of the type provided with first signal means, the first signal means presenting a signal representing the voltage applied to the conductor members, second signal means, the second signal means presenting a signal representing the current flow through the conductor members, phase detector means, the phase detector means being joined to the first signal means and to the second signal means, the phase detector means sensing the phase angle between the signal of first signal means and the signal of the second signal means, voltage comparator means, means connecting the voltage comparator means to the phase detector means, whereby the phase detector means provides a voltage signal to the voltage comparator means, switch means, connector means connecting the switch means to the voltage comparator means and to the conductor members for deenergization of the electric motor, the improvement comprising voltage compensation means compensating for variations in the amplitude of the voltage applied to the electric conductor members, the voltage compensation means including voltage sensing means connected to one of the electric conductors and providing a voltage signal proportional to the amplitude of the applied voltage, the voltage sensing means including means compensating for variations in phase angle between the applied voltage to the electric conductors and the current flow through the electric conductors as a function of the amplitude of the applied voltage, amplifier means connected to the voltage sensing means, the amplifier means including an output terminal, and means connecting the output terminal of the amplifier means to the voltage comparator means, whereby the amplifier means provides a voltage signal to the voltage comparator means, the voltage comparator means comparing the voltage signal received from the phase detector means and the voltage signal received from the amplifier means and operating the switch means when the difference between the voltage signals is of a predetermined magnitude, the improvement also including attentuation means, means connecting the attenuation means to the second signal means and attenuating the harmonics in the voltage wave form developed in the current flow through the conductor members.

8. A protective circuit for a fluid pump which is operated by an alternating current electric motor to which electric energy is applied through a plurality of electric conductor members, and in which the amplitude of the applied voltage may vary, the protective circuit being of the type provided with first signal means, the first signal means presenting a signal representing the voltage applied to the conductor members, second signal means, the second signal means presenting a signal representing the current flow through the conductor members, phase detector means, the phase detector means being joined to the first signal means and to the second signal means, the phase detector means sensing the phase angle between the signal of first signal means and the signal of the second signal means, voltage comparator means, means connecting the voltage comparator means to the phase detector means, whereby the phase detector means provides a voltage signal to the voltage comparator means, switch means, connector means connecting the switch means to the voltage comparator means and to the conductor members for deenergization of the electric motor in accordance with a predetermined phase angle sensed by the phase detector means, the improvement comprising voltage compensation means compensating for variations in the amplitude of the voltage applied to the electric conductor members, the voltage compensation means including voltage sensing means connected to one of the electric conductors and providing a voltage signal proportional to the applied voltage, modification means modifying the voltage signal in accordance with m(V Line)−k, in which V Line is the potential applied to the electric conductor members and m is a constant slope and in which k is a fixed voltage, the voltage sensing means including means compensating for variations in phase angle between the applied voltage to the electric conductors and the current flow through the electric conductors as a function of the amplitude of the applied voltage, the voltage sensing means including an output terminal, and means connecting the output terminal of the voltage sensing means to the voltage comparator means, whereby the voltage sensing means provides a voltage signal to the voltage comparator means, the voltage sensing means thus providing a voltage signal which compensates for variations in the amplitude of the applied voltage, the voltage comparator means comparing the voltage signal received from the phase detector means and the voltage signal received from the voltage sensing means and operating the switch means when the difference between the voltage signals is of a predetermined magnitude.

9. The method of protecting a liquid pump which is operated by an electric motor to which alternating current electrical energy having a fundamental frequency is applied through a plurality of electric conductor members, and a switch operable to connect and to disconnect the electric motor with respect to the electric conductor members comprising:

providing a first voltage signal, the first voltage signal being related to the current flow through the electric conductor members and through the electric motor, attenuating harmonic frequencies which exist in the first voltage signal, providing a second voltage signal, the second voltage signal being related to the voltage of the alternating current electrical energy which is applied to the electric conductor members, sensing the phase angle between the first voltage signal and the second voltage signal and obtaining a phase angle voltage signal proportional to the phase angle, and operating the switch when the phase angle voltage signal exceeds a predetermined magnitude.

10. A protective circuit for a fluid pump which is operated by an alternating current electric motor to which electric energy is applied through a plurality of electric conductor members, and in which the amplitude of the applied voltage may vary comprising:

first signal means, the first signal means presenting a signal representing the voltage applied to the conductor members, second signal means, the second signal means presenting a signal representing the current flow through the conductor members, phase detector means measuring the phase angle between the signal of first signal means and the signal of the second signal means, voltage comparator means, means connecting the voltage comparator means to the phase detector means, switch means, connector means including operator means connected to the switch means and to the voltage comparator means for deenergization of the electric motor in accordance with a predetermined phase angle sensed by the phase detector means, voltage compensation means connected to one of the electric conductor members and compensating for variations in voltage applied to the electric conductor members, and means connecting the voltage comparator means to the voltage compensation means, the voltage compensation means including voltage divider means connected to one of the electric conductors, a first resistor and a capacitor connected to the voltage divider means, and an operational amplifier having a first input terminal and a second input terminal, the first input terminal being connected to the first resistor, a second resistor connected to the first resistor and to the first input terminal of the operational amplifier, the operational amplifier having an output terminal, a third resistor connected to the output terminal of the operational amplifier and to the second input terminal of the operational amplifier, a potentiometer, a fourth resistor connected between the second input terminal of the operational amplifier and the potentiometer, and means connecting the output terminal of the operational amplifier to the voltage comparator means.

* * * * *